Patented Mar. 6, 1951

2,543,976

UNITED STATES PATENT OFFICE 2,543,976

PROCESS OF PREPARING TABLETS OF SODIUM GENTISATE DIHYDRATE

Werner Maximillian Lauter, Glen Rock, N. J., and Marcel David Brucar, New York, N. Y., assignors to Hoffmann-La Roche Inc., Nutley, N. J., a corporation of New Jersey No Drawing. Application August 7, 1948, Serial No. 43,154

5 Claims. (Cl. 167—82)

The present invention relates to tableting and more particularly to the production of tablets for therapeutic use containing an alkali metal salt of gentisic acid. More specifically, the invention relates to the tableting of sodium gentisate by compressing tablet granulations of this compound.

Sodium gentisate as normally produced contains between somewhat over four and 5.5 molecules of water of crystallization. Tableting of this so-called sodium gentisate pentahydrate is attended by various difficulties. The granulation is difficult to compress and, moreover, has a tendency to stick to the punches. Furthermore, the sodium gentisate pentahydrate is unstable, discolors and decomposes upon storage. It is believed that the compound becomes discolored due to its tendency to form a quinone. Thus, tablets prepared by compressing granulations containing sodium gentisate pentahydrate, which are creamy white when first prepared, on being subjected to an accelerated storage test at 45° C. for 500 hours, turned to a dark brown color and softened to a putty-like consistency. This test is generally presumed to be equivalent to storage of the tablets at room temperature for a period of one year. However, tablets containing sodium gentisate pentahydrate after only two weeks storage at room temperature (20–25° C.) already exhibited discoloration and softening.

According to the present invention, we have found that if sodium gentisate containing no more than approximately two molecules of water of crystallization is employed in the tableting operation, the aforementioned difficulties are overcome. The granulation is easier to compress into tablets and does not stick to the punches. Furthermore, the tablets have been found to be stable over long periods of time, do not become discolored or decomposed, but retain their whitish color when subjected to the above described storage test.

In accordance with the present invention, sodium gentisate pentahydrate is first dehydrated to sodium gentisate dihydrate or a lower hydrate, and the latter compound incorporated into the granulations; or the pentahydrate can be hydrated during the preparation of the granulation.

We have found that in granulations containing sodium gentisate pentahydrate, the latter readily loses most of its water of crystallization on treatment with a solvent which forms an azeotropic mixture with water, as, for example, with an alcohol such as isopropanol, isobutanol, tertiary butanol; or a ketone such as acetone, methyl ethyl ketone, cyclohexanol, ethyl acetoacetate, or mesityl oxide. In general the procedure involves treating the granulation with an aqueous solution containing approximately 30–50 per cent of the solvent, as for example, isopropanol, and then removing the solvent as by drying at a temperature between 100–120° F. Sodium gentisate dihydrate or lower hydrates are thus obtained, the pentahydrate having lost three or more mols of its water of crystallization without discoloration.

In the preferred mode of carrying out our invention in the manufacture of tablets, a mixture of sodium gentisate pentahydrate with any suitable excipient is granulated with an isopropanol-USP syrup solution containing about 25 per cent of the USP syrup, 25 per cent of water and about 50 per cent of isopropanol. The granulation is then dried at about 100–120° F., mixed, if desired, with lubricants usually employed in the tableting and the mixture subjected to compression to form the tablets. While smaller amounts of the alcohol may be employed to dehydrate the sodium gentisate pentahydrate, a longer period of time is required to obtain the necessary dehydration. The final tablets contain about 10–13 per cent of moisture, inclusive of the crystal water in the dihydrate.

The following examples will serve to illustrate the invention:

*Example 1*

377.4 grams of sodium gentisate pentahydrate, 63.75 grams of lactose, 29.75 grams of corn starch and 12.75 grams of sucrose are mixed together. This mixture is then granulated with a solution containing 25 per cent USP syrup, 25 per cent water and 50 per cent of anhydrous isopanol. The granulation is then dried at 120° F. for two hours. This removes substantially three mols or more of the water of crystallization from the sodium gentisate pentahydrate. The granulation is then forced through a number 14 mesh screen and to the screened material are added 4 per cent talc, 1 per cent magnesium stearate and 2 per cent of stearic acid as lubricants. The resulting granulation is then compressed into tablets. The tablets retain their original white appearance when subjected to the above described storage test.

In the same manner, any of the above mentioned solvents can be employed to dehydrate the sodium gentisate pentahydrate in the granulation.

Example 2

78.3 grams of sodium gentisate dihydrate are triturated with 15 grams of lactose, 7 grams of anhydrous starch, and 3 grams of powdered sucrose until a uniform mixture results. The resulting mixture is compressed into slugs, and subsequently broken up into No. 16 mesh size particles. To the granules are added 4 per cent talc, 1 per cent magnesium stearate, and 2 per cent stearic acid as lubricants. The resulting granulation is compressed into tablets. The tablets when subjected to the above described accelerated storage test retain their whitish color. On the other hand, tablets processed in the identical manner but employing sodium gentisate pentahydrate, when subjected to the storage test, lost their original whitish appearance, turned dark brown and softened to a putty-like consistency.

The process for preparing the sodium gentisate dihydrate employed in Example 2 involves mixing sodium gentisate pentahydrate (air dried, containing about 30–35 per cent of water of crystallization) with a solvent which forms an azeotrope with water, as for example, any of the solvents already mentioned; namely, acetone, methyl ethyl ketone, isopropanol, isobutanol, tertiary butanol, cyclohexanone, ethyl acetoacetate, and mesityl oxide. The employment of acetone is particularly effective and requires merely shaking of the sodium gentisate pentahydrate with about five to ten times its amount of acetone. After a few minutes the dihydrate crystallizes out of the acetone in the form of characteristic voluminous needles filling the whole vessel. The following is illustrative of the procedure when isopropanol is employed:

20 grams of sodium gentisate pentahydrate is suspended in 100 cc. of isopropanol at 20–30° C. and the mixture stirred. Within five minutes the mixture turns into a voluminous white crystal mush, which after fifteen minutes is filtered by suction, washed or filtered with isopropanol and dried in air below 70° C. until free from isopropanol. A substantially quantitative yield of sodium gentisate dihydrate is obtained.

Example 3

88.8 grams of sodium gentisate pentahydrate are triturated with 15 grams of lactose, 7 grams of anhydrous corn starch, and 3 grams of powdered sucrose until a uniform mixture is obtained. The mixture is moistened with a solution of USP syrup and water (50 per cent). The moistened mixture obtained is broken up into No. 6 mesh. size particles and dried at 120° F. for seven hours, whereby three mols or more of water of crystallization is removed from the sodium gentisate pentahydrate. The dried particles are again screened through a No. 16 screen, and 4 per cent talc, 1 per cent magnesium stearate, and 2 per cent stearic acid are added as lubricants. The resulting granulation is compressed into tablets. When subjected to the above described storage test, the tablets retain their original whitish appearance.

In this example, dehydration of the granulation is accomplished without the aid of a solvent forming an azeotropic mixture with water as illustrated by Example 1. While effective, the process is more complicated and time consuming.

We claim:

1. A process of preparing tablets of sodium gentisate which comprises forming a mixture of sodium gentisate pentahydrate, granulating the mixture with a solvent which forms an azeotrope with water to remove at least three mols of water of crystallization from the sodium gentisate pentahydrate, and compressing the granulation into tablets.

2. A method of compressing tablets of sodium gentisate which comprises forming a mixture of sodium gentisate pentahydrate and an excipient, granulating the mixture with an isopropanol-USP syrup solution to remove at least three mols of water of crystallization from the sodium gentisate pentahydrate, and compressing the granulation into tablets.

3. A process of preparing sodium gentisate dihydrate which comprises treating sodium gentisate pentahydrate with a solvent which forms an azeotrope with water.

4. A process of preparing sodium gentisate dihydrate which comprises treating sodium gentisate pentahydrate with acetone.

5. A process of preparing sodium gentisate dihydrate which comprises treating sodium gentisate pentahydrate with isopropanol.

WERNER MAXIMILLIAN LAUTER.
MARCEL DAVID BRUCAR.

REFERENCES CITED

The following references are of record in the file of this patent:

Silver—Manufacture of Compressed Tablets (1944), page 49.

Sabalitschka—Chemical Abstracts, vol. 26, pages 3617, 3618 (1932).

Sollmann—Manual of Pharmacology; 7th ed. (1948), page 532.

Beilstein—Handbuch der Organischen Chemie (Vierte Auflage), vol. 10, (1927), page 385.

Wightman—American Chemical Journal, vol. 46, page 68 (1911).

Certificate of Correction

Patent No. 2,543,976                                                                March 6, 1951

WERNER MAXIMILLIAN LAUTER ET AL.

It is hereby certified that error appears in the printed specification of the above numbered patent requiring correction as follows:

Column 1, line 47, for the syllable and hyphen "hy-" read *dehy-*; column 2, line 39, for "isopanol" read *isopropanol*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*